UNITED STATES PATENT OFFICE.

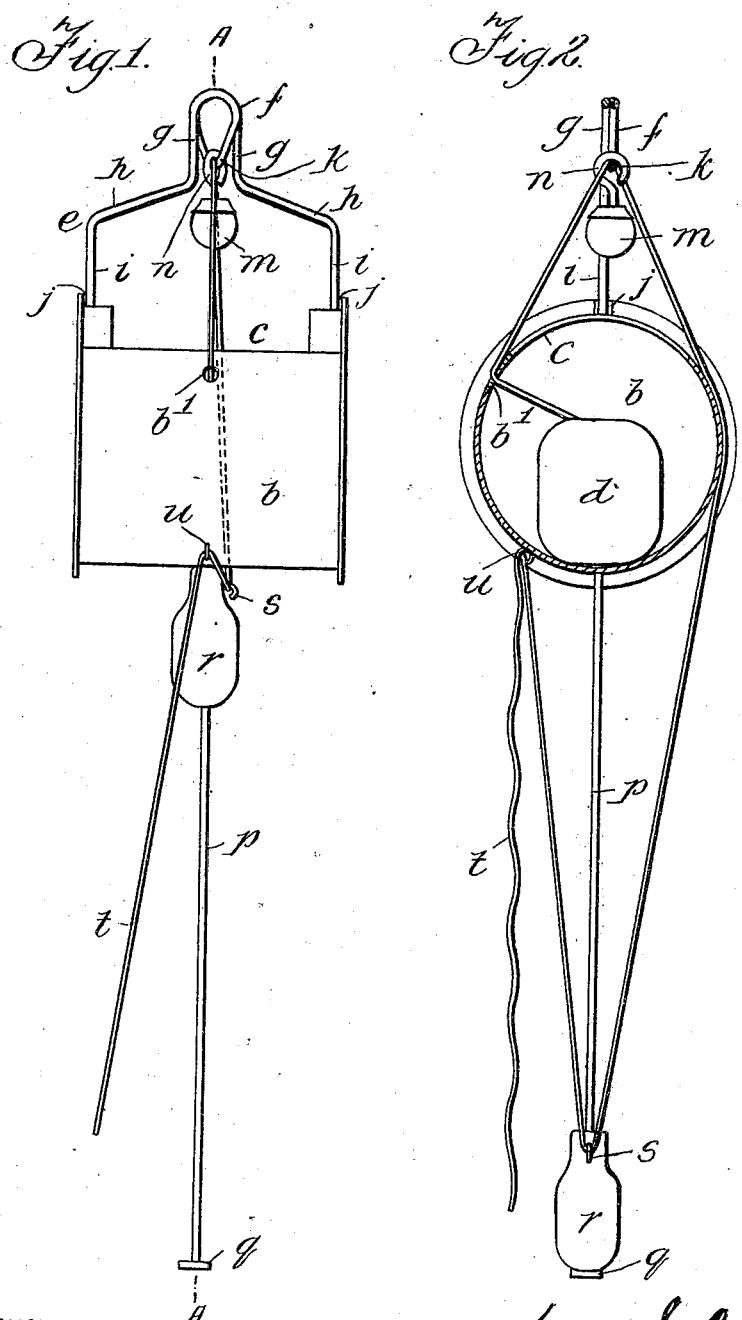

SAMUEL JAMES CURRY, OF INNISFAIL, ALBERTA, CANADA.

TWINE-HOLDER.

990,961.  Specification of Letters Patent.  Patented May 2, 1911.

Application filed November 14, 1910. Serial No. 592,229.

*To all whom it may concern:*

Be it known that I, SAMUEL JAMES CURRY, of Innisfail, in the Province of Alberta, Canada, have invented certain new and useful Improvements in Twine-Holders; and I do hereby declare that the following is a full, clear, and exact description of the same.

My invention consists of the combination and arrangement of parts hereinafter described and pointed out in the claims.

For full comprehension, however of my invention reference must be had to the accompanying drawings forming a part of this specification, in which similar reference characters indicate the same parts and wherein—

Figure 1 is a side elevation of my improved twine holder; and Fig. 2 is a transverse sectional view taken on line A A Fig. 1.

The twine receptacle proper $l$ is of cylindrical form horizontally arranged and having an opening $c$ in its top to permit the ball of twine $d$ to be introduced, and a hole $b'$ serving as an eye for the passage of the twine. $e$ is a hanger made from a single length of wire bent to form a loop $f$ supported from its upper end by a pair of vertical portions $g$ terminating in inclined portions $h$ the ends whereof are turned down as at $i$ and soldered or otherwise secured as at $j$ to end flanges upon the receptacle $b$. The lower portion of the loop is compressed as at $k$ to acute angular form, and a tension ball $m$ is suspended by a hook $n$ from such angular portion of the loop. The take-up device utilized in connection with this receptacle comprises a rod $p$ depending from the underside thereof and having a stop in the form of a disk $q$ at its lower end, while a counter weight $r$ having an eye $s$ soldered thereon is slidably carried on such rod. An eye $u$ is soldered to the underside of the cylinder.

The end $t$ of the twine is passed through the eye $b'$ thence through the loop $f$, and the eyes $s$ and $u$. The first pull upon the end of the twine will cause the portion thereof passing through the loop $f$ to sink beneath the hook $n$ and be subjected to the tension of the weight $m$, until the ball of twine is finished.

What I claim is as follows:—

1. In a twine holder the combination with a receptacle, of a hanger attached to the receptacle and consisting of a piece of bent wire presenting a hanging loop adapted to have the twine pass therethrough and the lower portion of which is compressed to localize the twine at the bottom of the loop; and a weighted hook between which and the loop the twine passes suspended from such loop as described.

2. A twine holder comprising a horizontally arranged cylindrical receptacle with an opening in the middle of its top for the introduction of a ball of twine, a perforation at one side for the passage of the twine and an eye on its underside; a wire hanger attached to such receptacle and formed with a hanging loop having its lower portion compressed to form an acute angle; a weighted tension device bearing upon the inside surface of the said compressed portion of the loop; a rod extending downwardly from the bottom of the receptacle; and a counter-weight slidably mounted upon such rod and having an eye through which the twine passes, substantially as described.

3. A twine holder comprising a horizontally arranged cylindrical receptacle with an opening in the middle of its top for the introduction of a ball of twine, a perforation at one side for the passage of the twine and an eye on its underside; a hanger formed of a single length of wire bent at its center to form a downwardly projecting loop having its lower portion compressed to present an acute angle and the remaining portion of the length being bent first downwardly substantially parallel and close to the loop and then outward and downward for attachment to the receptacle; a rod extending downwardly from the bottom of the receptacle and a counter-weight slidably mounted upon such rod and having an eye through which the twine passes, substantially as described.

In testimony whereof, I have signed my name to this specification, in the presence of two subscribing witnesses.

SAMUEL JAMES CURRY.

Witnesses:
E. S. HOTCHKISS,
S. REES.

Copies of this patent may be obtained for five cents each, by addressing the "Commissioner of Patents, Washington, D. C."